United States Patent
Semmes (10) Patent No.: US 7,937,963 B1
(45) Date of Patent: May 10, 2011

(54) ARCHITECTURALLY ENHANCED CHILLER UNIT

(76) Inventor: Thomas Middleton Semmes, Gladstone, OR (US)

(*) Notice: Subject to any disclaimer, the term of this patent is extended or adjusted under 35 U.S.C. 154(b) by 253 days.

(21) Appl. No.: 11/542,946

(22) Filed: Oct. 2, 2006

(51) Int. Cl.
   *F28D 5/00* (2006.01)

(52) U.S. Cl. .......... 62/304; 62/305; 62/259.2; 62/259.1; 62/298; 62/259.4; 62/DIG. 16

(58) Field of Classification Search ............. 62/304, 62/259.2, DIG. 16, 259.1, 305, 298, 259.4
   See application file for complete search history.

(56) References Cited

U.S. PATENT DOCUMENTS

| | | | | |
|---|---|---|---|---|
| 3,857,253 | A | * | 12/1974 | Burgett et al. ............... 62/289 |
| 4,687,604 | A | * | 8/1987 | Goettl ....................... 261/29 |
| 4,827,733 | A | * | 5/1989 | Dinh .......................... 62/305 |
| 5,067,560 | A | * | 11/1991 | Carey et al. ............... 165/124 |
| D387,145 | S | * | 12/1997 | Knight ...................... D23/354 |
| 6,141,986 | A | * | 11/2000 | Koplin ....................... 62/304 |
| 6,179,214 | B1 | * | 1/2001 | Key et al. ................... 236/51 |
| 2003/0214055 | A1 | * | 11/2003 | Yazici et al. ............... 261/109 |
| 2004/0134226 | A1 | * | 7/2004 | Kraay et al. ................ 62/498 |
| 2005/0103032 | A1 | * | 5/2005 | Pierson ...................... 62/175 |

* cited by examiner

*Primary Examiner* — Cheryl J Tyler
*Assistant Examiner* — Jonathan Koagel
(74) *Attorney, Agent, or Firm* — Mark S. Hubert (57) ABSTRACT

The present invention is an architecturally advanced chiller unit having solid, insulated exterior walls adapted for the attachment of aesthetic surface treatments, pedestal supports for a bottom intake of ambient air, and separate chambers for electrical and hydraulic components. The roof houses inset modular fans adapted for topside maintenance and the roof also allows service accessibility to heat rejection components housed within the chiller unit enclosure. Heat removal is accomplished through angled heat exchangers also housed within the enclosure. Each enclosure has an end accessible vestibule that house electrical and refrigerant components. The chiller units design is also intended to allow the side by side placement of two or more units, for modularity. The improved aesthetic appearance of these units also eliminates the use of surrounding architectural parapet walls or screening units. The improved space effectiveness and modularity shall provide greater flexibility in building construction.

1 Claim, 10 Drawing Sheets

ARCHITECTURALLY ENHANCED CHILLER UNIT

BACKGROUND OF THE INVENTION

The present invention relates to an architecturally enhanced and more space efficient design for a chiller unit.

Chiller units, towers, condensers and other similar equipment that produces cooled fluids as a cooling means, are a necessity for most large buildings whether residential, commercial or industrial in nature. Heat transfer media such as water or refrigerant require a location where their heat energy can be removed, usually by transfer to the atmosphere. These units being noisy, large and requiring an abundance of access, are generally located on the rooftop of the building or at ground level. Herein lies the problem. These units are in visible locations yet form architectural eyesores. To remedy this situation, architects go to great lengths to make aesthetically appealing disguises. Walls, fences and flora are used to hide ground units whereas parapet walls and screening are used on roof units.

Current existing chiller units are not designed to allow the direct attachment of conventional wall sheathings to "dress them up". They have exposed compressors or fans, numerous wall and surface protrusions and require servicing from multiple sides not to mention needing extensive clearance room about their exterior periphery.

This new design will have the geometric configuration of a cuboid with smooth walls to which an appealing surface treatment such as stone or wood, can be mechanically affixed. This will result in an enclosed cuboid therein reducing the radiated noise levels. In most embodiments it will have an end accessible vestibule, housing the electrical distribution/control components as well as several other mechanical elements. The heat rejection fans will be inset into the roof and accessible from the roof. Air intake will be from the bottom of the unit. Pedestal legs will raise the unit fan for intake air passage. With this design multiple units can be mounted side by side in adjacent configuration.

Henceforth, an improved chiller unit would fulfill a long felt need in the building industry, especially in larger application that require multiple units and where space is at a premium. This new invention utilizes and combines known and new technologies in a unique and novel configuration to overcome the aforementioned problems and accomplish this.

SUMMARY OF THE INVENTION

The general purpose of the present invention, which will be described subsequently in greater detail, is to architecturally disguise larger scale chiller units, thereby enhancing the overall aesthetics of building serviced by the unit. It has many of the advantages mentioned heretofore and many novel features that result in a new chiller unit design which is not anticipated, rendered obvious, suggested, or even implied by any of the prior art, either alone or in any combination thereof.

In accordance with the invention, an object of the present invention is to provide an improved chiller unit design that does not have visible fans, compressors or heat transfer surfaces.

It is another object of this invention to provide an improved an improved chiller unit design that can be architecturally mated or configured to the building it is utilized with.

It is a further object of this invention to provide an improved chiller unit that has a minimal of side accesses and protrusions.

It is a further object of this invention to reduce the level of noise radiated outward from chiller units.

It is still a further object of this invention to provide for an improved chiller unit that looks like a cuboid having the heat rejection heat transfer media and heat rejection fans serviceable from the unit's top.

It is yet a further object of this invention to provide a chiller unit that is assembled and shipped as a single unit and wherein multiple units can be mounted side by side in adjacent modular configuration The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Figure 9:
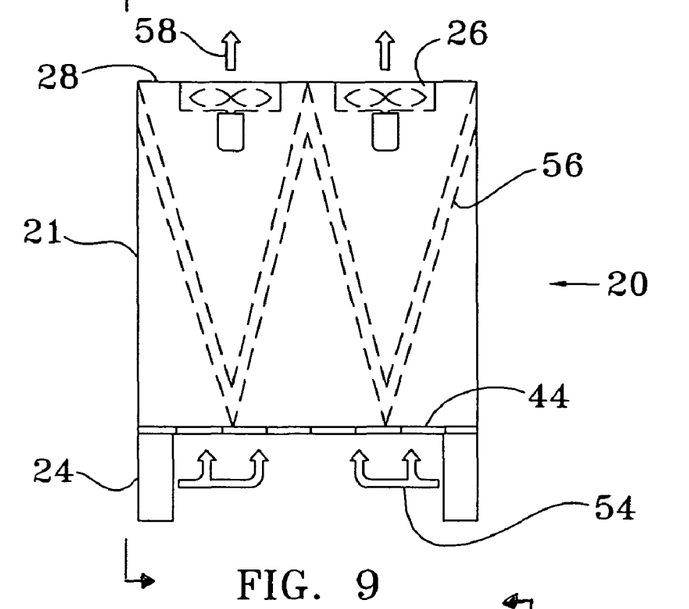
FIG. 9 is an end cross sectional view of the first embodiment improved chiller unit.
Figure 10:
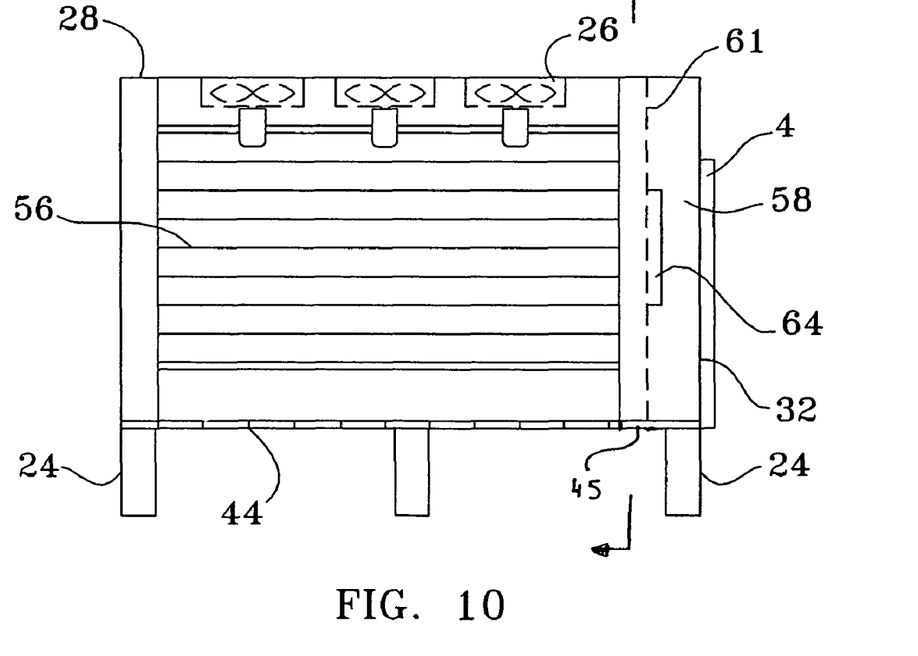
FIG. 10 is a side cross sectional view of the first embodiment improved chiller unit.
Figure 11:
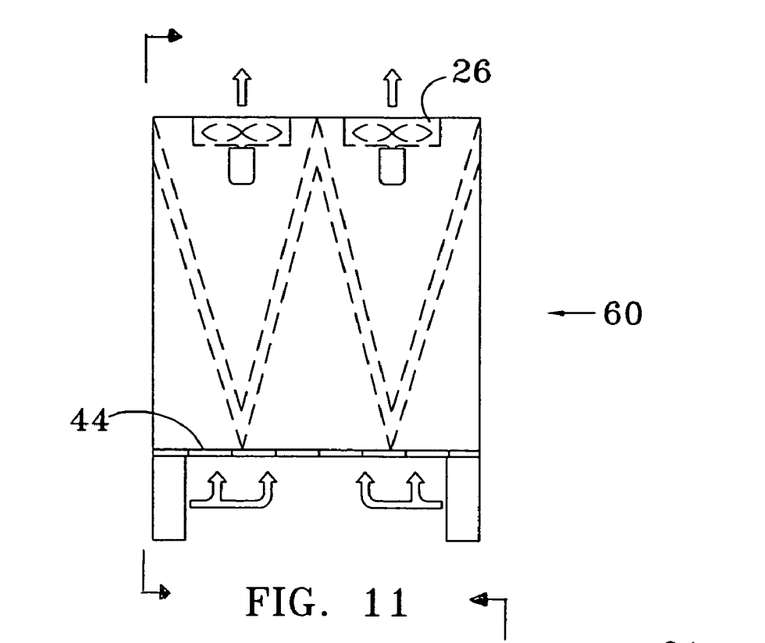
FIG. 11 is an end cross sectional view of the second embodiment improved chiller unit.
Figure 12:
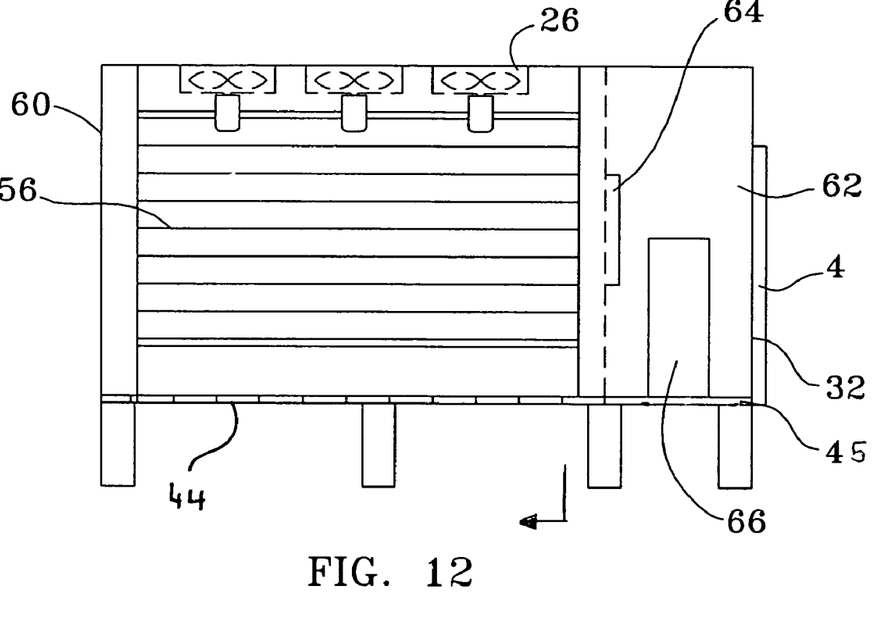
FIG. 12 is a side cross sectional view of the second embodiment improved chiller unit.
Figure 13:
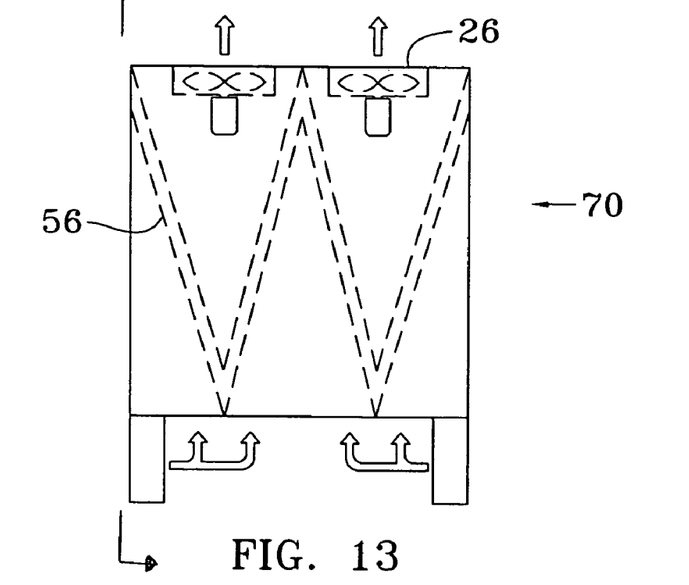
FIG. 13 is an end cross sectional view of the third embodiment improved chiller unit.
Figure 14:
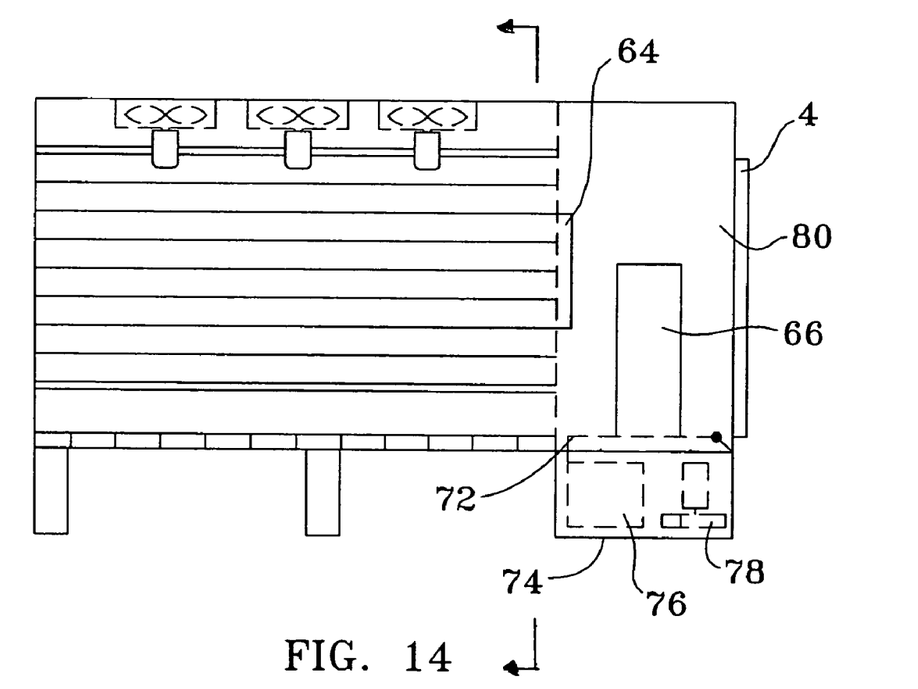
FIG. 14 is a side cross sectional view of the third embodiment improved chiller unit.

A chiller unit's basic function is to provide cooling water as a cooling output (heat sink) or as an end product. It can have various mechanical refrigeration components depending upon the manner of cooling, and these components may be assembled into a single unit or may be split into sub groupings residing in different locations in or about the building. The terms chiller, chiller unit, chiller plant, cooling tower, condensing unit, compressor condenser, dry cooler, heat exchanger are used to refer to specific combinations of components that provide means of cooling. In way of illustration, FIGS. 9 and 10 illustrate a wet tower dry cooler and a condenser. FIGS. 11 and 12 illustrate condensing units, compressors, condensers, and chiller units that are without a wet room. FIGS. 13 and 14 illustrate towers, chillers and chiller plants which include a wet room or a wet well which houses pumps and other hydraulic equipment. Air is the eventual heat transfer media that is the heat from the cooling system is rejected into, although this may be done in stages or through the use of other heat transfer media loops whether liquid or gas. The equipment used for the final heat rejection is typically located outside the building, on the roof or on ground level.

Figure 1:
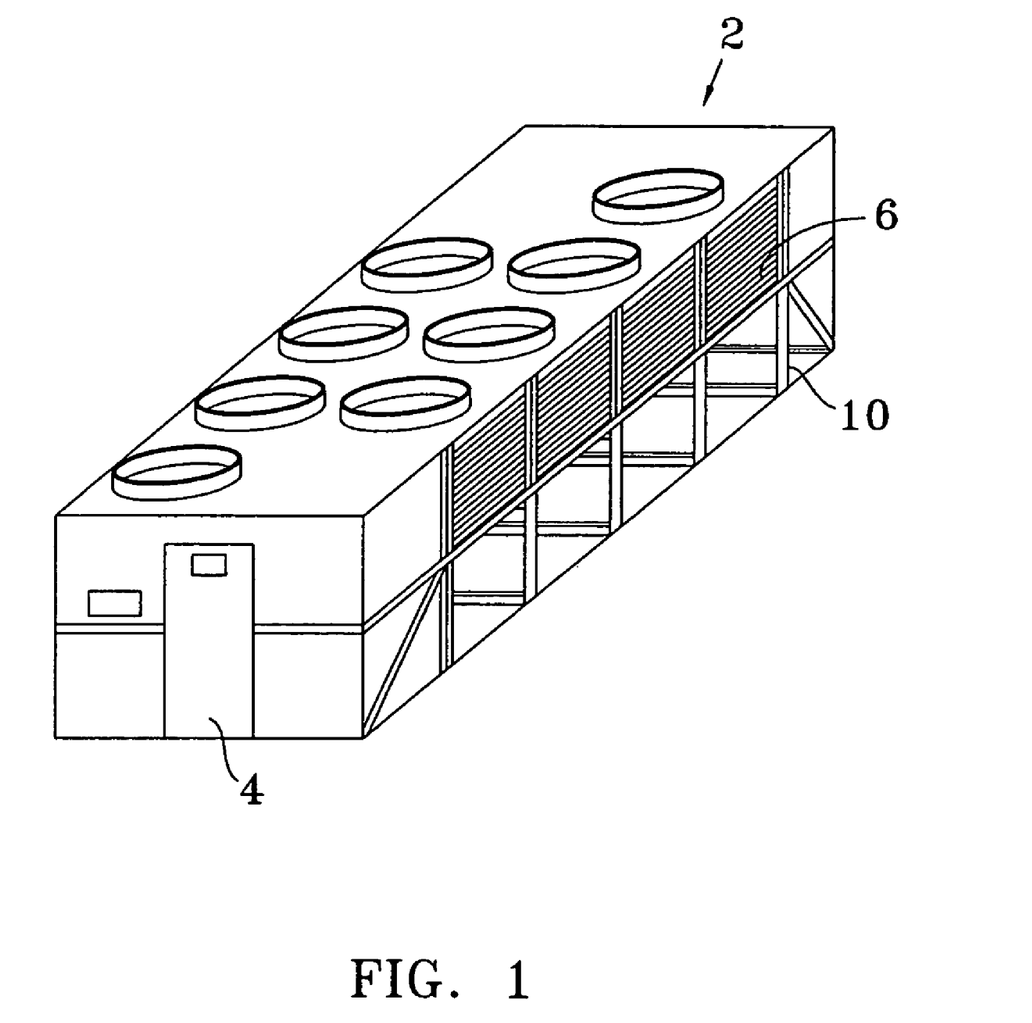
FIG. 1 is an view perspective view of the exterior of a conventional chiller unit.
Figure 2:
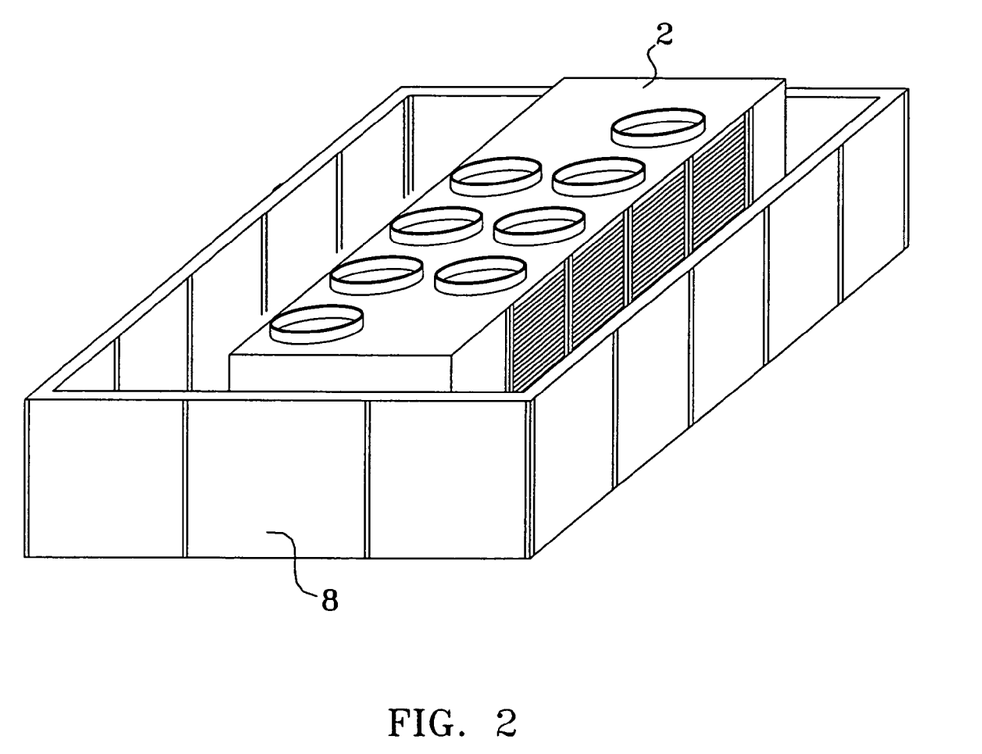
FIG. 2 is a perspective view of a conventional chiller unit disguised by an external architectural enclosure.

FIG. 1 shows a perspective view of the exterior of a typical chiller unit 2. These generally have at least one access door 4 and draw their cooling air through intakes 6 located on their sides. A pedestal 10 supports part of the unit 2 allowing certain mechanical components to be above ground level. The structure 10 facilitates either air draw from below, component access from below or placement of subordinate components at a lower elevation. The conventional chiller unit design is purely functional with little or no thought to aesthetic appeal as it generally resides unseen behind a parapet wall, a screen 8 or hedge. (Ref FIG. 2)

Figure 3:
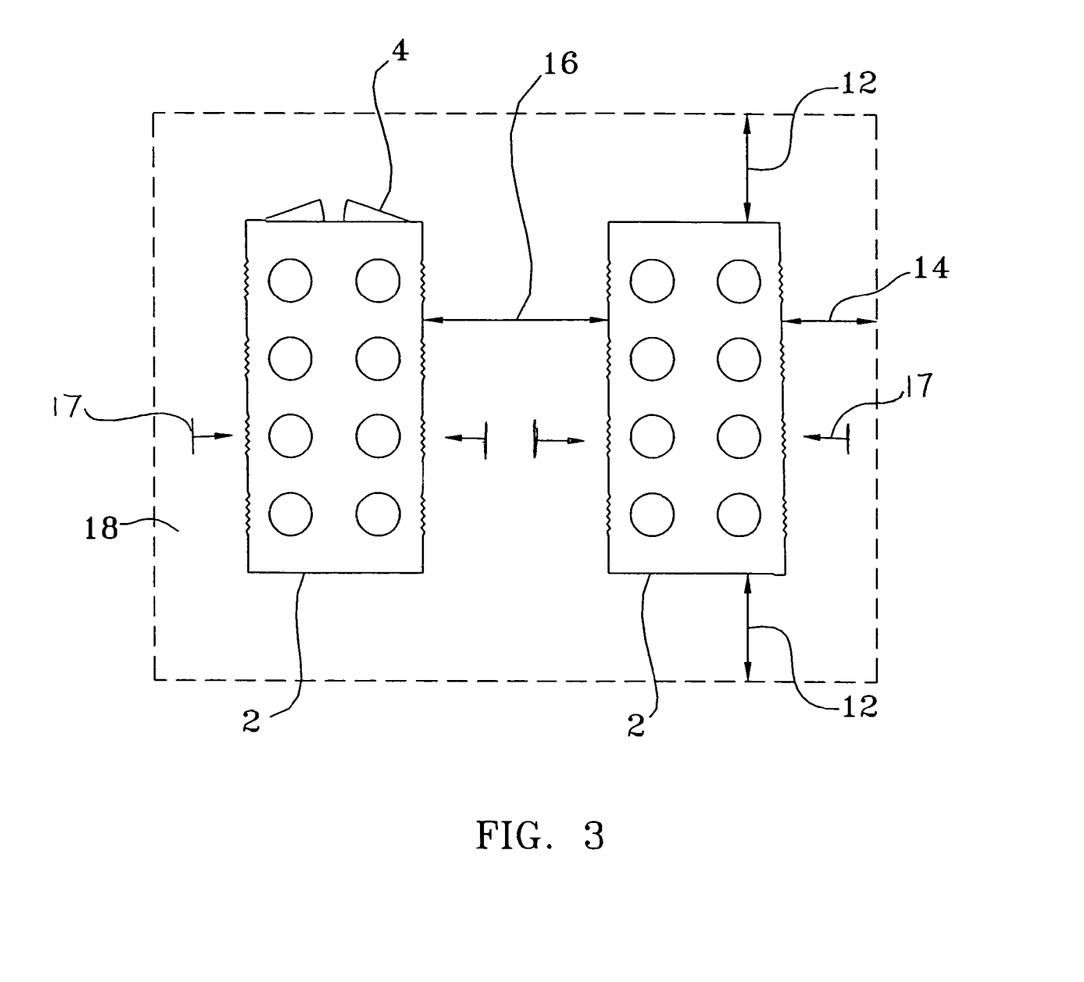
FIG. 3 is top view of two conventional chiller units in conventional spacing.

As can be seen in FIG. 3, since the conventional chiller unit 2 draws air from it's sides, it requires four to eight feet of peripheral clearance as indicated by dimensional arrows 12 and 14. As can be seen in FIG. 3, placement of two units 2 working in tandem requires spacing of up to sixteen feet between units as indicated by dimension arrow 16. Much of this space is necessary to ensure that there is no circulation of air flow established between the outlet and inlet flow paths 17 of one conventional unit 2 or crossed between multiple conventional units 2. This peripheral clearance necessitates longer piping runs between units, minimizes the number of units that can be placed in a defined area 18, and forces the utilization of larger screens 8.

Figure 4:
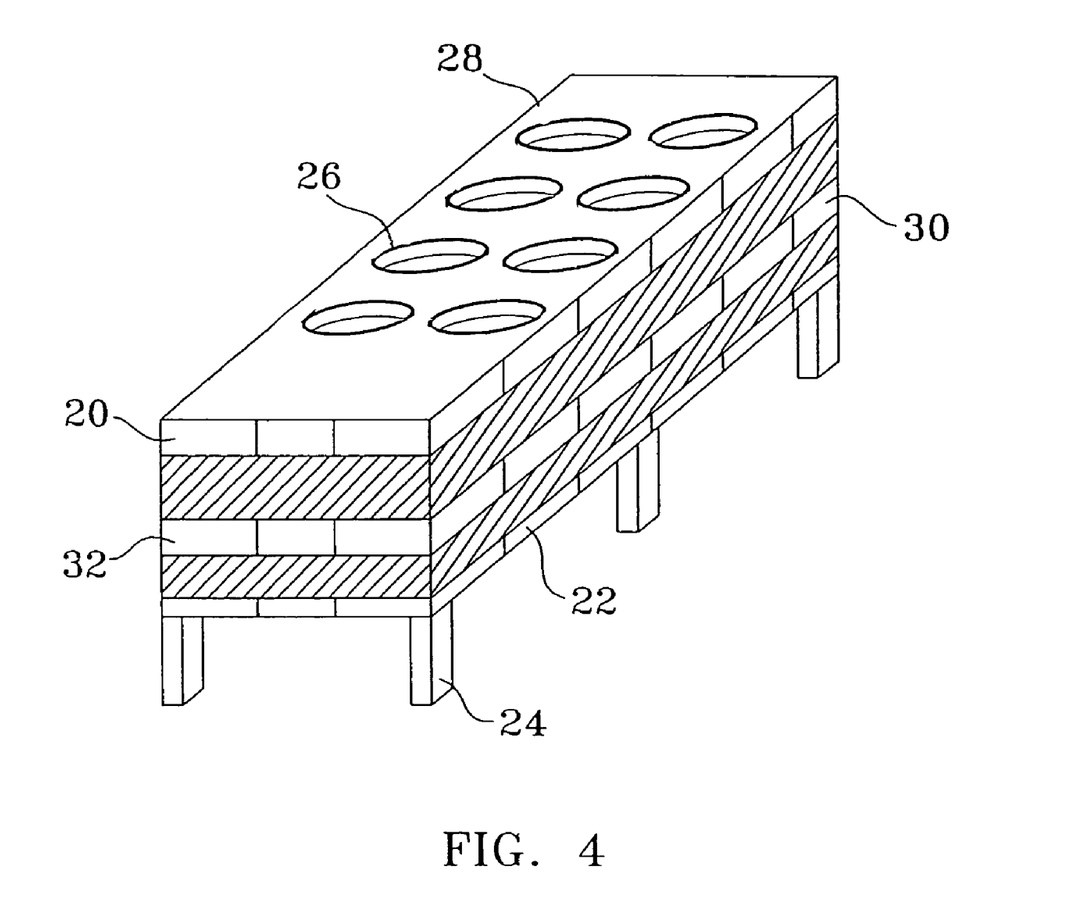
FIG. 4 is an end perspective view of the improved chiller unit with an architecturally patterned facade.

Looking at FIG. 4, an end perspective view of the improved chiller unit 20, it can be seen that it has a cuboid geometric shape with an architecturally patterned facade 22 mechanically attached (in this example as panels) to side walls 30 and end walls 32. Simple box style legs 24 are affixed to the unit's floor frame to maintain the unit 20 in it's elevated position. Fans 26 are mounted inset into the chiller unit roof 28. These fans 26 are of a modular unit configuration that facilitate easy and quick replacement. The use of bottom only intake allows for the smooth wall exterior which can accommodate the architecturally patterned facade 22. The smooth wall exterior encloses the chiller unit's internal components and reduces the exterior noise levels.

Figure 5:
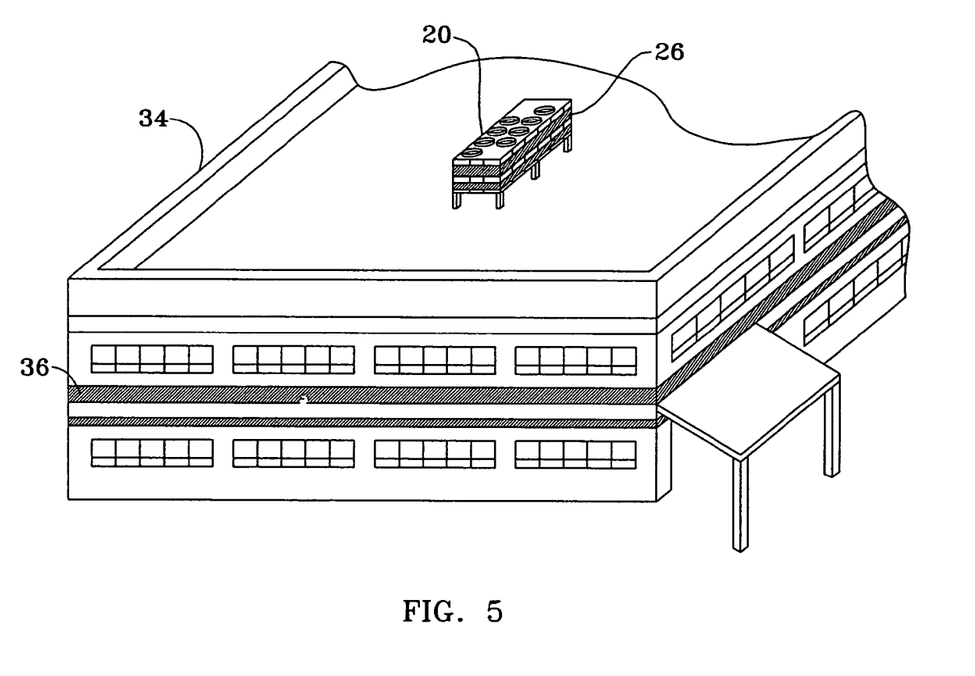
FIG. 5 is a perspective view of an improved chiller unit architecturally configured to match it's building.
Figure 6:
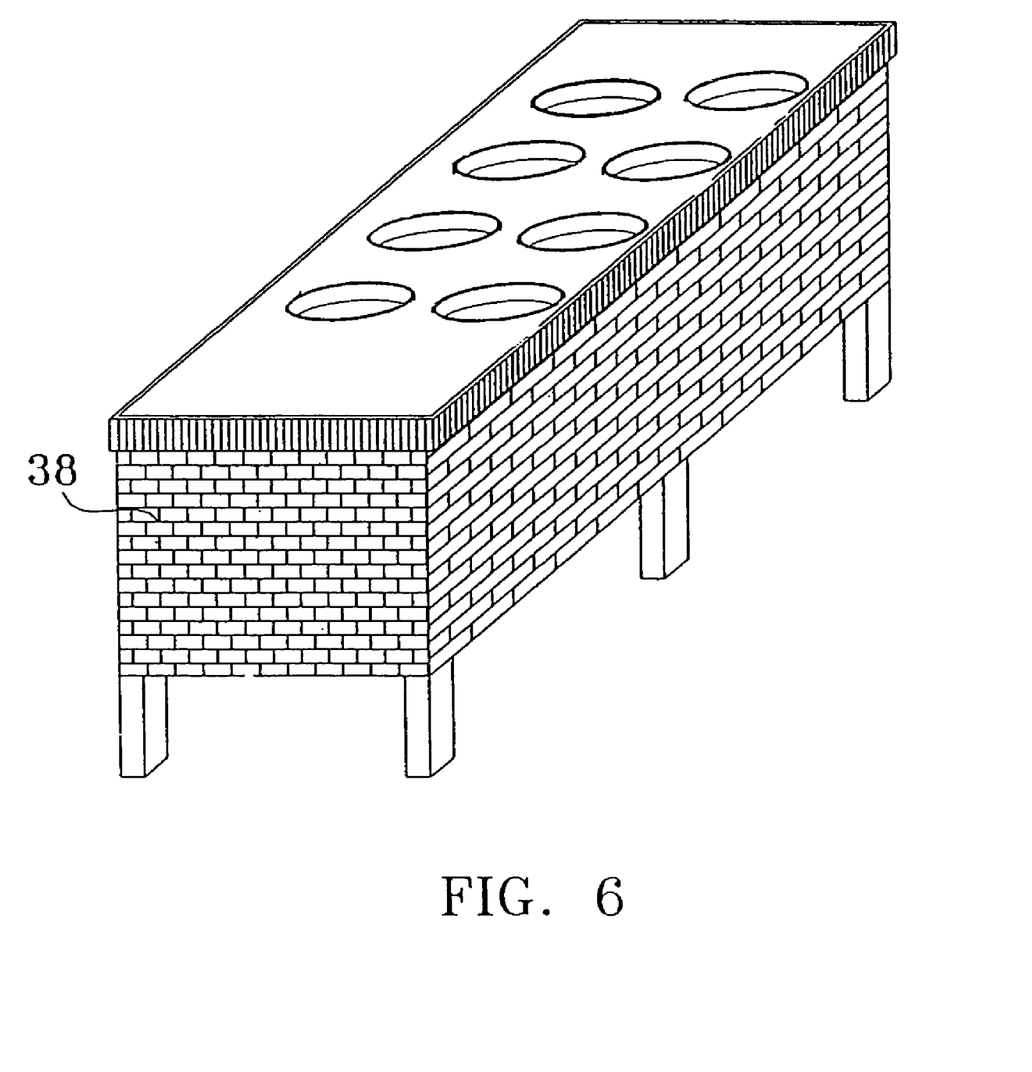
FIG. 6 is an end perspective view of the improved chiller unit with a brick facade.

FIG. 5 shows an improved chiller unit 20 atop building 34. The architecturally patterned facade 22 on the chiller unit has been configured to coordinate aesthetically with the building 34 as can be seen in complimentary stripes 36 on both the building 34 and the improved chiller unit 20. FIG. 6 shows a brick facade 38 affixed to an improved chiller unit 20. It is known that a plethora of designs, patterns and substrates may be affixed to the smooth walls. The noise reduction advantage offered by the use of smooth walls can be enhanced by the use of sound absorbing material on the wall panels.

Figure 7:
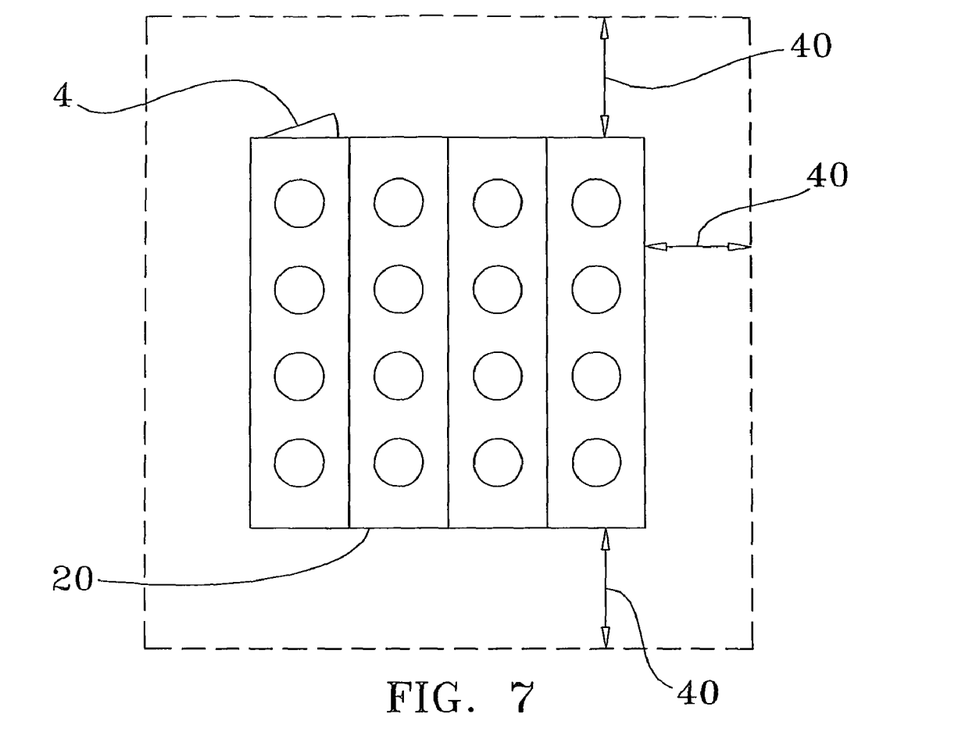
FIG. 7 is top view of two improved chiller units in modified spacing.

FIG. 7 illustrates the advantages of the present invention. With solid sides, top only servicing of the fans 26 and other components such as heat reject heat exchangers (not illustrated), and bottom location of the system piping 42 and 52, the improved chiller units 20 can be mounted directly adjacent to each other with their smooth side walls 30 touching or joined to each other with adjacent side walls 30 eliminated by direct frame connection as would be well know in the art. This minimizes the area required for installation. The ground or floor area required for installation of multiple improved chiller units 20 is that area large enough to accommodate the footprint of the combined units 20 and to allow opening of end access doors 4 (which could be of the sliding variety), and the placement of ladders and servicing equipment about the units 20 as indicated by dimensional arrows 40. There is still a small amount of room required for optimal air flow about the perimeter of the improved chiller units 20. All considered, the room required for an improved chiller unit 20 is substantially less than the area needed for installation of conventional chiller units 2 as illustrated in FIG. 3.

Figure 8:
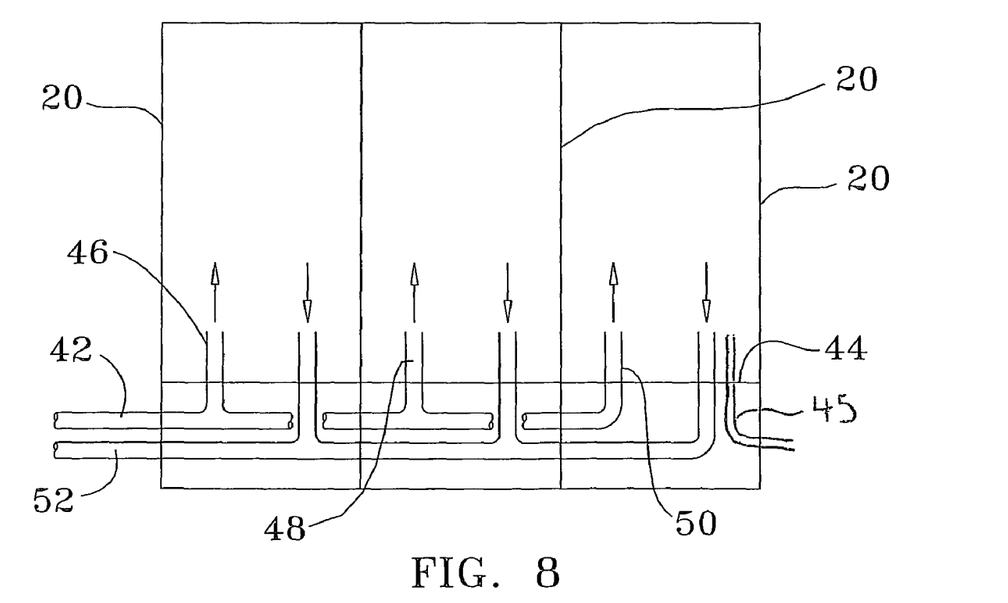
FIG. 8 is a side view illustration of a typical piping configuration for an improved chiller unit.

Another advantage of the improved chiller unit 20 is the simplicity of piping that is needed to connect multiple units 20. FIG. 8 shows a general plan drawing of a typical piping layout for three improved chiller units 20 operating in tandem. Here it can be seen that the inlet line piping 42 is routed through the units wet well and uses the minimum pipe length between the first inlet feed piping 46 second inlet feed piping 48 and third inlet feed piping 50. It is the same with the outlet line piping 52. Similarly, electrical conduit 45 is seen routed through the unit's wet well floor. While illustrated supported by legs 24, it is well known in the art that these legs may be connected by structural members to form a pedestal upon which the bottom intake 44 sits. The bottom intake is essentially a grated or louvered floor. The floor pedestal unit will be a separate component that will be located and mounted prior to the remaining parts. This is a simple structural frame and as such is well known in the art.

It is to be noted that the term "chiller unit" is used generically to refer to any one of the abovementioned specific combinations of cooling units. The novel features of the present invention can be incorporated completely or in part into any chiller unit. The first embodiment chiller unit of FIGS. 9 and 10 would more properly be termed a "Dry Cooler" as it's purpose is to indirectly cool water from the cooling water circuit by passing it through the tubes of an air cooled coil so as to cool the water to approximately 90 degrees F. in an indirect dry method of heat rejection. It is known that this same arrangement may be used for towers wherein the heat transfer occurs by direct evaporative means. The second embodiment chiller unit of FIGS. 11 and 12 would more properly be termed a "Condensing Unit" as it's purpose is to receive refrigerant gas, compress it and cool it to a liquid in an indirect dry method of heat rejection. It houses a compressor in an electrical room.

The third embodiment chiller unit of FIGS. 13 and 14 would more properly be termed a "Chiller Plant" because it houses a heat exchanger and water pumps in a wet well. It's purpose is to circulate cool water from the chilled water circuit by indirect wet heat rejection by passing it over the tubes of a refrigerant cooled, cooling coil so as to cool the water to approximately 40 degrees F.

Looking at FIG. 9, a cross sectional view of the first embodiment improved chiller unit 20, it can be seen that the enclosure 21 has a smooth walled exterior and an open frame 44 and is elevated on legs 24 so as to reside above the ground to allow ventilation flow through frame 44. Outside ambient air is drawn upward by roof mounted fans 26 through open frame 44 in the direction indicated by directional arrows 54, passing through angled heat exchanger/heat transfer media 56 and exiting the improved rooftop chiller unit's roof 28 in the direction indicated by directional arrows 54. Fans 26 are generally of the direct drive axial or propeller style.

It can be seen that the angled heat exchanger/heat transfer media 56 is formed into a "W" configuration. This offers the advantage of increased heat transfer efficiency since as the effective face area of the heat exchanger/heat transfer media 56 increases, the air resistance and face velocity decreases and more heat exchanger is encountered.

FIG. 10 represents the side cross sectional view of the first embodiment of the improved chiller unit 20. The electrical control panel 64 is located on an interior wall 61 in ante chamber 58 parallel to end wall 32. The ante chamber 58 has a conventional floor 45 affixed within the frame 44. This type of frame and floor is common construction that is well known in the art. The first embodiment improved chiller unit 20 represents the simplest of chiller unit designs. The water to be cooled is passed through or over the heat exchanger/heat transfer media 56 that has ambient air drawn through it. For purposes of visual clarity the water piping has been omitted.

FIG. 11 and FIG. 12 represent cross sectional views of the second embodiment improved rooftop chiller unit 60. This varies from the first embodiment chiller unit 20 in the addition of other refrigerant cycle components which are located in the second ante chamber 62. The air draw is still through the frame 44, across the angled, "W" configuration heat exchanger/heat transfer media 56 and though the roof fans 26. Here it can be seen that second ante chamber 62 is larger in volume than ante chamber 58 since it houses the compressor 66 as well as the electrical controls 64. For purposes of visual clarity the water piping has been omitted.

FIG. 13 and FIG. 14 illustrate cross sectional views of the third alternate embodiment chiller unit 70 (chiller plant) which differs from the other embodiments by the inclusion of additional mechanical equipment. As in all the improved chiller units, the exterior walls are smooth, the open frame is raised above ground and grated, the fans are ceiling mounted and the air draw is upward from the floor across angled heat exchanger coils. Specifically, this third alternate embodiment chiller unit 70 has an enclosed wet well 74 that houses pump 78, evaporator 76 and water distribution piping (not illustrated for clarity purposes). These components are accessible through a hinged openable floor grate 72 in third ante room 80. The ante room is accessible through end door 4 and also houses compressor 66 and electrical controls 64.

Although depicted in three embodiments, the novel features of the present invention are common to all embodiments and include smooth solid exterior walls adapted for the attachment of aesthetic surface treatments and to reduce the sound level of radial emitted noise, an elevated ante chamber floor adapted to allow under floor routing of refrigerant/fluid piping and/or electrical conduit as well as location for wet wells, an open bottom floor, fans adapted for topside accessibility, angled heat rejection coils, and end access doors leading into ante rooms (vestibules) such that the exterior housing is adapted to allow the side by side placement of two or more units without sacrificing heat rejection efficiency. Access to heat rejection heat exchangers may be from top and/or bottom. The improved aesthetic appearance of these units also eliminates the use of surrounding architectural parapet walls or screening units.

The above description will enable any person skilled in the art to make and use this invention. It also sets forth the best modes for carrying out this invention. Those skilled in the art will appreciate that the conception, upon which this disclosure is based, may readily be utilized as a basis for the designing of other structures, methods and systems for carrying out the several purposes of the present invention now that the general principles of the present invention have been disclosed. It is important, therefore, that the claims be regarded as including such equivalent constructions insofar as they do not depart from the spirit and scope of the present invention.

Having thus described the invention, what is claimed as new and desired to be secured by Letters Patent is as follows:

1. An improved chiller unit consisting of:
   at least one pedestal with at least four box style legs extending therefrom;
   an open floor frame and an open grate floor affixed thereon;
   a conventional floor panel;
   at least two smooth exterior side walls with sound absorbing material affixed thereto;
   at least two exterior end walls wherein at least one of said end walls has a smooth exterior, with at least one said exterior end wall having sound absorbing material affixed thereto and wherein at least one said end wall has an access opening;
   at least one interior wall;
   a roof;
   at least one modular, self-contained fan unit;
   at least one heat rejection coil positioned at an angle that is neither normal nor horizontal to a plane of said floor panel;
   wherein said floor frame resides atop at least one said pedestal upon which resides said side walls, said end walls, and said roof, assembled so as to form a chiller unit enclosure having a heat rejection room having an open floor and a vestibule with a conventional floor panel, located at separate ends an end of said enclosure separated by said interior wall and wherein said fan is inset mounted into said roof and said coil is housed inside said heat rejection room.

* * * * *